United States Patent [19]

Ueno et al.

[11] Patent Number: 4,782,447
[45] Date of Patent: Nov. 1, 1988

[54] SYSTEM AND METHOD FOR NAVIGATING A VEHICLE

[75] Inventors: Hiroshi Ueno; Toshiyuki Itoh, both of Yokosuka; Masakazu Tsunoda, Fujisawa; Yasushi Kawakami, Tokyo; Shuei Tamura, Ryugasaki; Makoto Iwabuchi, Tone, all of Japan

[73] Assignees: Nissan Motor Company, Ltd, Kanagawa; Niles Parts Company, Ltd., Tokyo, both of Japan

[21] Appl. No.: 846,560

[22] Filed: Mar. 28, 1986

[30] Foreign Application Priority Data

Apr. 3, 1985 [JP] Japan .................................. 60-70622

[51] Int. Cl.⁴ .............................................. G06F 15/50
[52] U.S. Cl. ..................................... 364/449; 364/521; 364/424.02; 340/995
[58] Field of Search ............... 364/443, 436, 449, 444, 364/450, 460, 521; 340/995; 73/178 R

[56] References Cited

U.S. PATENT DOCUMENTS

| | | | |
|---|---|---|---|
| 3,984,806 | 10/1976 | Tyler | 364/450 |
| 4,312,577 | 1/1982 | Fitzgerald | 340/995 X |
| 4,470,119 | 9/1984 | Hasebe et al. | 364/449 |
| 4,490,717 | 12/1984 | Saito | 364/460 |
| 4,514,810 | 4/1985 | Ito et al. | 364/424 |
| 4,570,227 | 2/1986 | Tachi et al. | 364/444 |
| 4,608,656 | 8/1986 | Tamaka et al. | 364/521 |
| 4,635,202 | 1/1987 | Tsuji et al. | 364/449 |
| 4,638,438 | 1/1987 | Endo et al. | 364/449 |
| 4,660,037 | 4/1987 | Nakamura | 364/449 |
| 4,675,676 | 6/1987 | Takanube et al. | 364/449 X |

Primary Examiner—Parshotam S. Lall
Assistant Examiner—Thomas G. Black
Attorney, Agent, or Firm—Lowe, Price, LeBlanc, Becker & Shur

[57] ABSTRACT

A navigation system and method for guiding a vehicle along a selected route of travel to a destination from a starting point using a display unit. In the navigation system, a positional relationship between a start road branched from a first known branching point (a start intersection from which a guidance of the vehicle along the selected route of travel is initiated) and entrance direction of the vehicle toward the first known branching point is clearly and distinguishably displayed on the screen of the display unit after the selection of the route of travel from the starting point to the destination so that the vehicle can corectly enter the start road at the first known branching point even if it has reached the first known branching point via any arbitrary route of travel from the starting point.

18 Claims, 9 Drawing Sheets

FIG.2
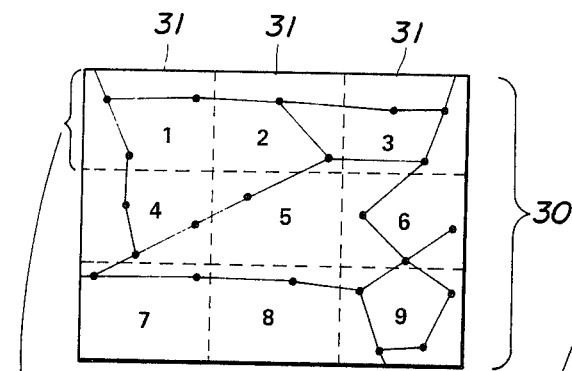
FIG.3
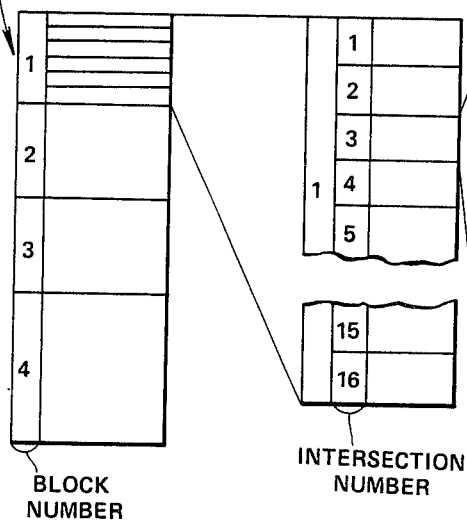
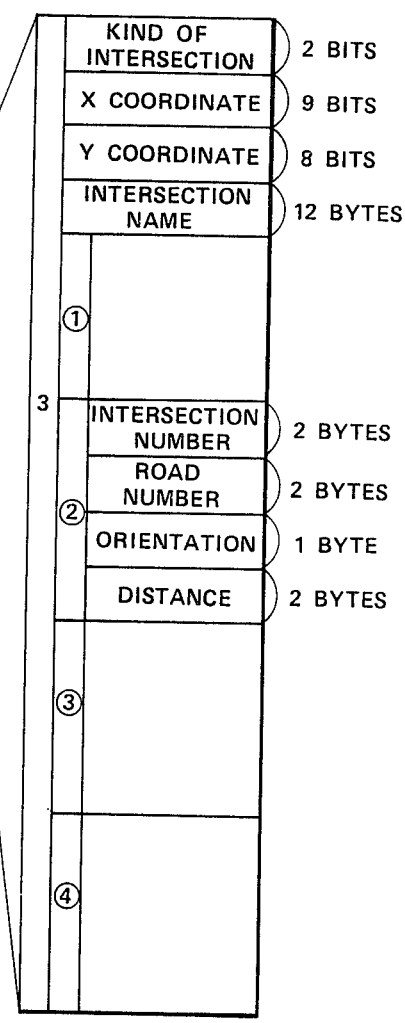

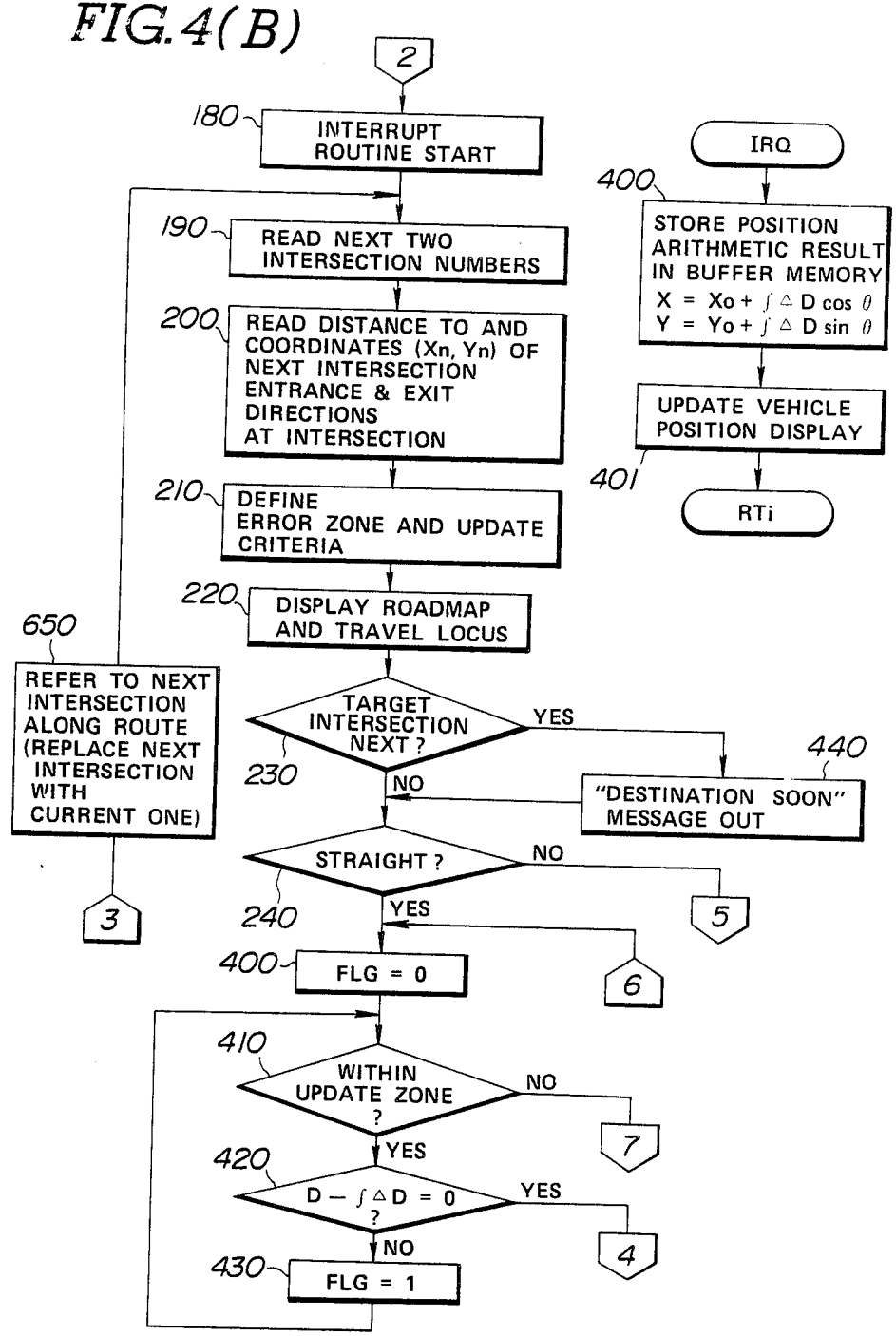

SYSTEM AND METHOD FOR NAVIGATING A VEHICLE

BACKGROUND OF THE INVENTION

The present invention relates generally to a navigation system for a vehicle and method therefor.

More specifically, the present invention relates to navigation systems and methods employing a graphic display unit on which a roadmap and the current position of the vehicle are displayed, so that the driver of the vehicle can drive the vehicle in accordance with a present travel course displayed on the display unit.

This kind of navigation system for vehicles is disclosed in a Japanese patent application Unexamined Open No. Sho 58-112199 published on July 4, 1983.

In the above-identified Japanese patent application document, a series of guidance information necessary to guide the vehicle to a final destination along a preset route of travel is displayed on a screen of a display unit so as to enable the driver to drive the vehicle in accordance with the preset route of travel displayed on the display unit to reach the final destination.

In this kind of navigation system, the driver drives the vehicle on an arbitrary route until the vehicle reaches a first intersection (hereinafter referred to as a start intersection) at which the guidance of vehicle along the preset route of travel is initiated and thereafter the driver can drive the vehicle along the preset route of travel to arrive at the final destination.

However, there is a drawback in the above-described navigation system that in a case where the driver has little or no knowledge of information on roads in a region around the start intersection, the driver often mistakes a road radiated from the start intersection and at which the vehicle is initially to start the travel along the preset course since the driver cannot find such a start road.

SUMMARY OF THE INVENTION

With the above-described drawback in mind, it is an object of the present invention to provide a system and method for navigating the vehicle which can clearly guide the vehicle to travel from the above-described start road present at the start intersection by distinguishably displaying a direction of the start road preferably with respect to a road through which the vehicle enters the start intersection on the display unit even when the vehicle reaches the start intersection via any arbitrary travel route from a rest position, i.e., the starting point.

This can be achieved by providing a system for navigating a vehicle, comprising: (a) first means for monitoring a distance travelled by the vehicle and vehicle direction and deriving data on the instantaneous position and direction of the vehicle, (b) second means for storing roadmap data including configurations of a plurality of known branching points, (c) third means allowing designation of a route of travel from a first known branching point through which the vehicle is first to pass to a final destination, (d) fourth means for determining a first road connected to the first known branching point and through which the vehicle is to arrive at the first known branching point on the basis of the present direction of the vehicle derived by the first means with respect to the first known branching point and data on each direction of roads branched from the first known branching point stored in the second means, and (e) fifth means for displaying the positional relationship between a second road branched from the first known branching point and through which the vehicle is to travel along the designated route of travel from the first known branching point and the first road on a display screen thereof.

BRIEF DESCRIPTION OF THE DRAWINGS

A more complete understanding of the present invention may be obtained from the following description taken in conjunction with the attached drawings in which:

FIGS. 2 and 3 show the roadmap data format used as storage contents of a map data storage unit shown in FIG. 1;

FIGS. 4(A) through 4(D) are integrally a processing flowchart for executing a vehicle guidance process in the navigation system shown in FIG. 1;

DETAILED DESCRIPTION OF THE PREFERRED EMBODIMENTS

Reference will hereinafter be made to the drawings in order to facilitate understanding of the present invention.

Figure 1:
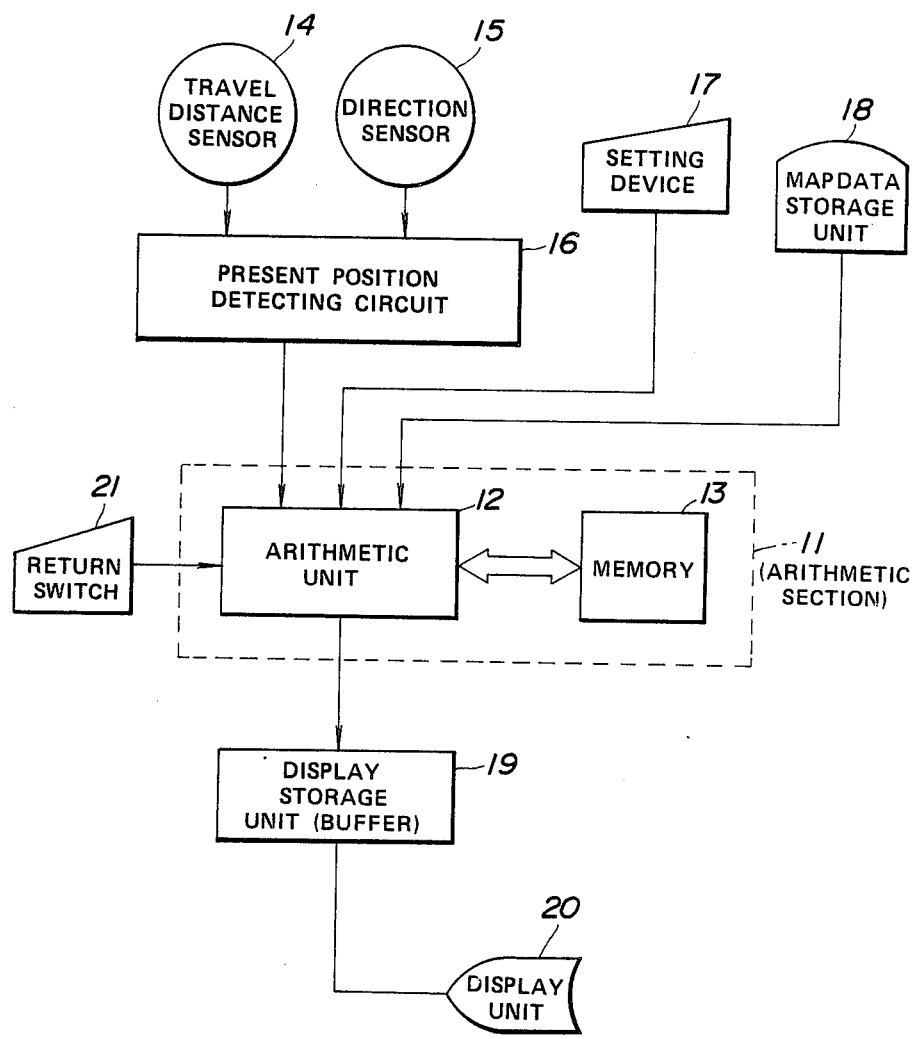
FIG. 1 is a circuit block diagram of a preferred embodiment of a navigation system for a vehicle according to the present invention.
Figure 4A:
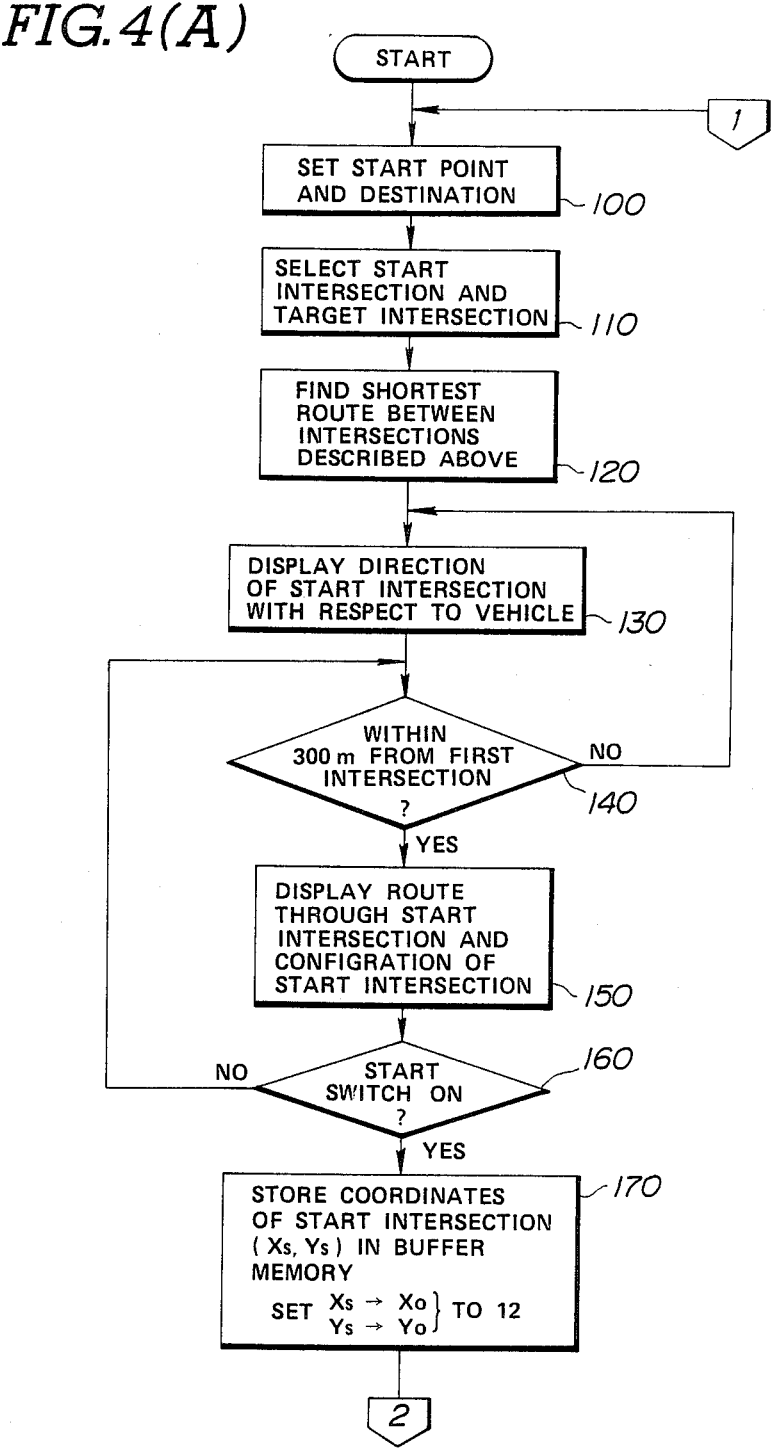
Figure 4C:
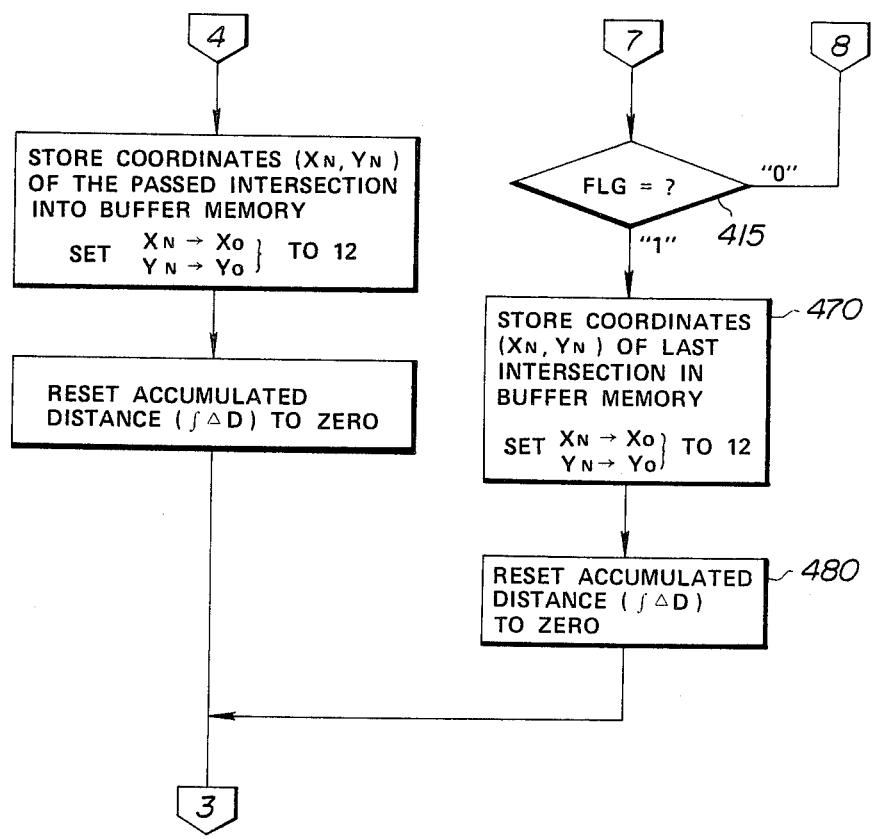
Figure 4D:
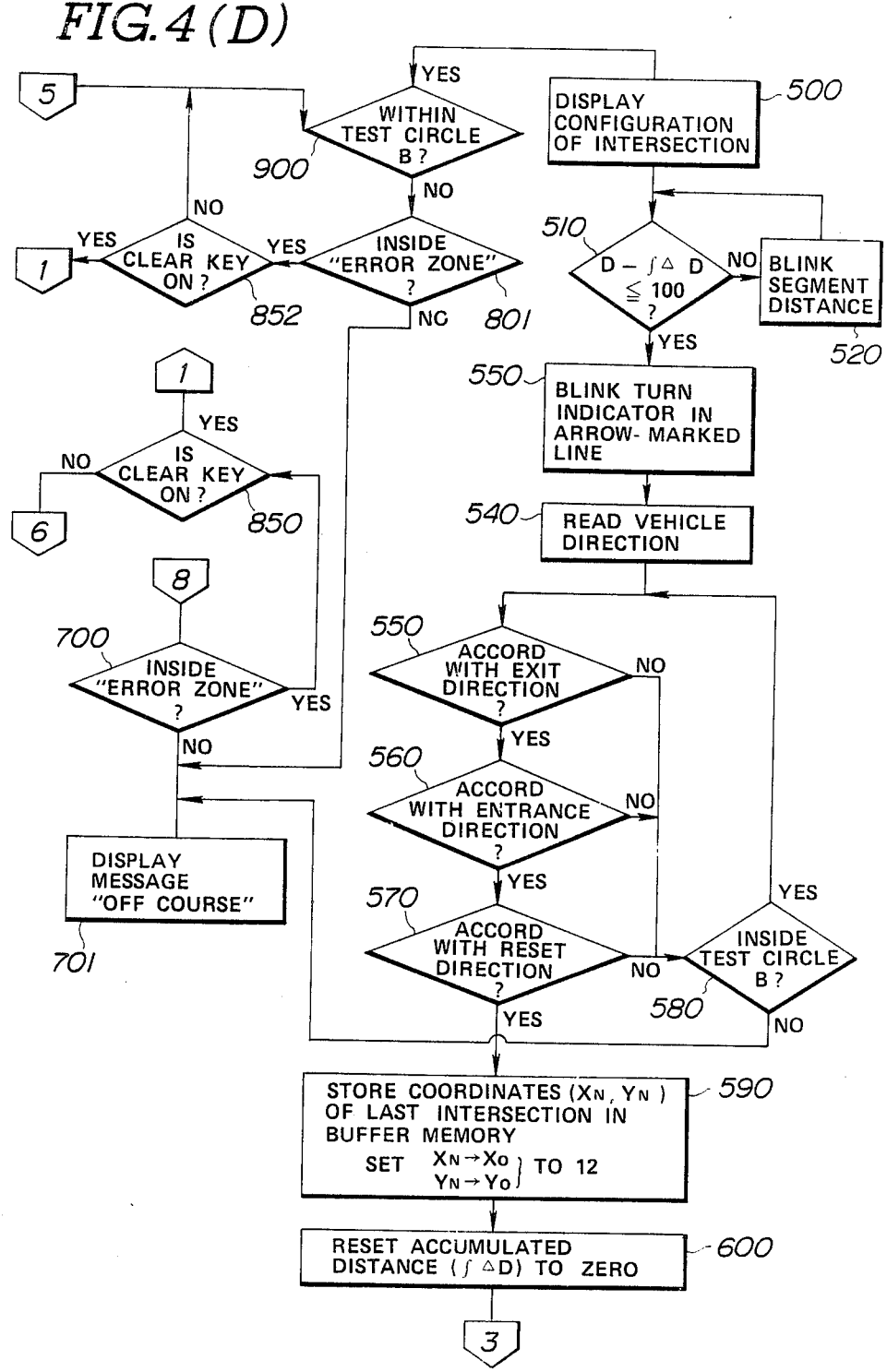

FIG. 1 shows a hardware circuit configuration of the navigation system in a preferred embodiment according to the present invention.

As shown in FIG. 1, the navigation system comprises an arithmetic section 11 constituted by a microcomputer. The arithmetic section 11 includes an arithmetic unit 12 and memory 13. The input side of the arithmetic section 11 is connected to a current position detecting circuit 16 which monitors the current position of the vehicle on the basis of the output signals of a travel distance sensor 14 and a direction sensor 15, a setting device including a ten key pad 17 for receiving and providing an information on the present position of the vehicle and the destination of the vehicle, a roadmap data storage unit 18, and a return switch 21. The direction sensor 15 detects an angle between geomagnetic North and orientation of the vehicle.

The construction of the direction sensor 15 is exemplified by a U.S. Pat. No. 4,442,609 issued on Apr. 17, 1984, the contents of which is hereby incorporated by reference.

An output section (e.g., the output interface of the arithmetic section 11) is connected to a display unit (e.g., a Cathode Ray Tube (CRT)) 20 capable of displaying an image of roadmap, etc., via a display storage unit 19 which temporarily holds display information signals.

FIGS. 2 and 3 illustrate an example of the structure of the roadmap data stored in the roadmap data storage unit 18 shown in FIG. 1. For example, each regional roadmap such as Japan national, Hokkaido, Tohoku, Kanto, Central, Kansai, Chugoku, Shikoku, Kyushu, and so on is further divided into a plurality of individual regions. The roadmap information for each region is stepwise divided from upper divisions such as national roads (interstate freeways in the United States) to lower divisions such as regional roads (Prefectural roads and City roads).

The storage area within the storage unit 18 is divided into a plurality of blocks corresponding to regional areas 31 into which the map (FIG. 2) is subdivided. In addition, each block is subdivided into a plurality of intersection areas, each including information on configuration of the corresponding intersection, such as a T-type or cross-type, X-Y coordinate information for identifying the location of the intersection, the intersection name, and the intersection number, connecting road number, direction, and distance to all neighboring major intersections. It should be noted that X-Y coordinate information is utilized to determine whether the vehicle approaches the registered intersection and each road direction information is utilized to obtain an entrance road or to process a graphical representation of intersection to be described later.

FIGS. 4(A) through 4(D) integrally form a flowchart for explaining an action of the navigation system.

The flowchart shown in FIGS. 4(A) through 4(D) is roughly divided into two processing blocks: (a) initial selection of the course of travel and initial guidance to an intersection from which the vehicle is to start (steps 100 through 150); and (b) road guidance along the selected route to a final goal (steps 160 through 240).

Before explaining the initial selection and initial guidance in the steps 100 through 150, a general explanation of the road guidance will described below in order to facilitate the operation of the navigation system.

In details, in a step 160, the arithmetic section 11 determines whether a start switch preferably located on the setting device 17 is depressed, supposing that the vehicle has reached a first known branching point (i.e., a start intersection at which the guidance along the preset route of travel is initiated).

When the start switch is depressed, the X-Y coordinate (Xs, Ys) of the first known branching point is plotted on a buffer memory incorporated into the processing data storage unit 13 (memory). In addition, an arithmetic operation circuit within the arithmetic unit 13 carries out such setting operations as the X-Y coordinate of the first known branching point (Xs, Ys) initially set to (Xo, Yo) in a step 170.

Thereafter, whenever the vehicle has travelled through a constant distance ΔD, the present position of the vehicle (X, Y) is calculated within the arithmetic unit 12 and plotted in the buffer memory in a step 300. The calculation and plotting operations are enabled in response to an interrupt routine shown in FIG. 4(B) which is independent of the series of navigation program and the start timing thereof does not necessarily coincide with a step 180.

It is noted that in this interrupt routine, accmulated distance traveled from the initial point (Xo, Yo) is calculated. Since the interrupt routine is triggered after every given interval ΔD of travel of the vehicle, the distance covered by the vehicle from the starting point or the most recent intersection will be the sum of all ΔD's, which will be hereinafter referred to as "total travel distance $\int \Delta D$", at the step 300 in the interrupt routine. Also, in the step 300, the instantantaneous vehicle position coordinates (x, y) in the display map coordinate system are derived according to the following equations:

$$x = x_o + \int (\Delta D \times \cos\theta)$$

$$Y = Y_o + \int (\Delta D \times \sin\theta)$$

The derived total travel distance $\int \Delta D$ and the instantaneous vehicle position (x, y) are transferred to a buffer memory in the display unit 20 for use in update vehicle position symbol on the map display, which is actually performed in a subsequent final step 301.

On the other hand, in a step 190, data for then next two intersections are read out from the memory 13. these include distance data indicative of the distance D from the first intersection to the next intersection and the known coordinates (Xn, Yn) of the next intersection and the known coordinates (Xn, Yn) of the next intersection in the display map coordinate system. In a step 200, direction data indicative of the orientation of the vehicle as it approaches the next intersection from the most recent intersection, which direction will hereinafter be referred to as "entry direction $\theta$in" and the direction of vehicle as it travels away from the next intersection, which direction will hereinafter be referred to as "exit direction $\theta$out".

In a step 210, criteria for recognizing an intersection are derived. These includes an update direction value $\theta r$ derived from the entry direction $\theta$in and the exit direction $\theta$out. The update direction $\theta r$ is basically the bisector of the angle subtended by the entry direction $\theta$in and the exit direction $\theta$out. It is derived in the following manner:

When the absolute value of the difference $\Delta\theta$ between the entry direction $\theta$n and the exit direction $\theta$out is smaller than 180°, the update direction $\theta r = (\theta in + \theta out)/2$; and when the difference $\Delta\theta$ is greater than 180°, the update direction $\theta r = (\theta in + \theta out)/2 + 180$.

In a step 210, an update zone which extends a given distance from the next intersection (X₁, Y₁) is also derived. The configuration of the update zone varies depending upon a distance D between the first update zone or the starting point and the next update zone. The configuration of the update zone is defined by the intersection of a circle and an elongated rectangle centered on the next intersection (X₁, Y₁. The radius of a circle about the next intersection is 0.1 D. The minor axis of the rectangle is 0.06 D centered on the intersection and its major axis is longer than the radius of the circle. This figure is actually the geometric result of the two criteria for recognizing that the vehicle position approximately coincides with the intersection, namely; (1) that the current detected vehicle position is within 0.1 D of the intersection; and, (2) that the total travel distance $\int \Delta D$ is within +0.03 D of the known distance between the two intersections in question. It is noted that the relatively high accuracy of the travel distance sensor is reflected in the 0.03 D value and the relatively low directional accuracy is reflected in the 0.1 D value.

In addition, an error zone is also set up in the step 210. The error zone is in the form of a rectangle extending from the first intersection or the starting point to the next intersection. In addition, the longitudinal ends of the rectangle are defined by circles 0.1 D centered on the two intersections. The rectangle is 0.5 D wide, so that the error zone covers a corridor 0.25 D to either side of the line connecting the intersections and extending about 0.1 D past both intersections. It should be noted that this area covers the update zone completely.

Furthermore, the route followed by the vehicle cannot deviate by more than 0.25 D from the straight-line path—this imposes a need for extra preset intersections on especially circuitous roads.

In the next step 220, map and the vehicle position symbol are displayed on the display screen of the display unit 20 so as to renew the display for the next intersection.

Then, in a step 230, the program checks to determine whether or not the next intersection is the one closest to the destination. The intersection closest to the destination will be referred to as the "target intersection". If the next intersection is the target intersection, a message "APPROACHING DESTINATION" is legibly displayed on the display screen 20 in a step 240. In either case, in a step 250, the present route is checked to see whether the vehicle is to pass straight through the intersection rather than turning.

If the vehicle is to pass straight through the intersection, a flag FLG is reset to zero in a step 400. Otherwise control passes to a step 900 which will be discussed later. After the flag FLG is reset at the step 400, the program checks to see whether the vehicle is in the update zone, at a step 410. If the vehicle is in the update zone in the step 410, control passes to a step 420; otherwise the routine goes to a step 415.

In the step 420, the distance $\int \Delta D$ travelled since the last intersection is compared with the known distance D between the two updating points. If the measured distance $\int \Delta D$ matches the known distance D, when checked at the step 420, control passes a step 450, in which the vehicle position coordinates (X, Y) are replaced with the coordinates $(X_1, Y_1)$ of the current intersection.

Thereafter, in a step 460, the travel distance $\int \Delta D$ between the intersections is reset to zero. Then, data identifying the current pair of intersections is updated so as to point the next stretch of the preset route in the step 217. Thereafter, control returns to the step 190.

On the other hand, if the difference between the measured distance $\int \Delta D$ and the known distance D is other than zero at the step 420, the flag FLG is set to one in a step 430. Then control returns to the step 410. The steps 410, 420, and 430 are repeated until the vehicle leaves the update zone on the difference between the calculated distance $\int \Delta D$ and the known distance D reaches zero when as checked at the step 420, i.e., until the vehicle reaches the intersection.

If the vehicle is outside of the update zone in the step 410, then the flag FLG is checked in a step 15. If the flag FLG is set to "1" in the step 15, the routine goes to a step 470, in which the coordinates (Xn, Yn) of the intended intersection are used to replace the coordinates (Xo, Yo). In other words, once the vehicle enters an update zone and the flag FLG is set to "1", that intersection will be assumed to be reached even if the known distance between intersections does not agree with the measured distance travelled by the vehicle. The travel distance value $\int \Delta D$ is reset once to zero in a step 480. In the step 480, distance from the most recent point to a point at which the vehicle goes out the update zone and determined in the step 410. Thereafter, control returns to the step 190 via the step 650.

If the flag FLG is not set ("0") when checked in a step 700, the routine checks to see whether the vehicle is in the error zone. If the answer is NO, i.e., the vehicle is outside of the error zone, such a message as "OFF COURSE" (or "route error") is displayed in a step 701 on the display screen 20 and then the routine ends. On the other hand, if the vehicle is still within the error zone, the program checks a "CLEAR" key present in the setting device 17 in a step 850. If the "CLEAR" key has been depressed at the step 850, control returns directly to the step 100; otherwise control returns to the step 400.

As described above, if the vehicle is to change direction significantly (step 250), control passes to a step 900 in which the program issues a command to check to see if the vehicle is in the update zone B. If YES in the step 900, a graphic image on the next intersection to be passed therethrough is displayed with that of the current intersection moved downward on the display screen 20. The display image generated in the step 500 includes a number of indicator segments, each indicative of a given distance of vehicle travel arranged along the route in both entry and exit directions. In step 510, the distance travelled denoted by $\int \Delta D$ is checked against the known distance D and if there is less than 100 meters difference (YES), a turn indicator on the display screen starts to blink to signal that the vehicle should turn, in a step 305. Before the 100-meter mark, the display segments are sequentially turned off with each unit of travel distance as the vehicle approaches the intersection, in a step 520. After the step 530, the vehicle orientation is measured in a step 540 and checked against the entry, exit, and reset directions $\theta$in, $\theta$out, $\theta$r, respectively in steps 550, 560, and 570. If the vehicle direction is found to be erroneous in any of these steps, a step 580 checks to determine if the vehicle is still in the update zone. If not in the step 580, control passes to the step 222 in which the display unit is operated to display the message "OF COURSE", as the vehicle is clearly of course. Otherwise, the loop 550, 560, and 570 is repeated until the vehicle turns far enough to match the reset direction $\theta$r. Once this happens, control passes from steps 590 and 600 which are substantially identical to steps 470 and 480.

While, if the vehicle is not within the update zone when checked at the step 900, then the vehicle position is again checked to determine if the vehicle still travels within the error zone, in a step 801.

If the vehicle is outside the error zone when checked in the step 801, the message "OF COURSE" is displayed at the step 701. If the vehicle is in the error zone when checked in the step 801, the routine checks to see if the CLEAR key has been depressed or not in a step 852. If the "CLEAR KEY" has been pressed, control returns to the initialization step 100; otherwise control returns again to the step 900.

Next, the series of processes in which the initial selection of the course of travel and initial guidance to the intersection from which the vehicle is to start are carried out will be described below with reference to FIG. 4(A) through FIG. 7.

First, in a step 100, the setting device 17 is used to identify the starting point of the vehicle, i.e., its present location and its destination with predetermined codes, etc. When identification signals on the starting point and destination are received from the setting device 17 in the step 100, the arithmetic unit 12 selects the intersection nearest the arting point from among the intersections adjacent to the starting point and a target intersection through which the vehicle is to pass last from among the intersections adjacent to the destination in a step 110.

Figure 5:
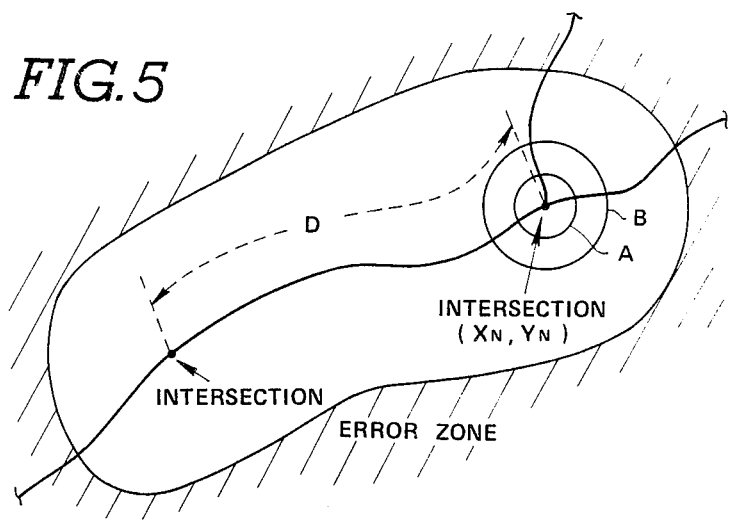
FIG. 5 is an exemplary graphic image displayed on a display unit for explaining a theory of the navigation processing shown in FIGS. 4(A) through 4(E)

It is noted that FIG. 5 shows examples of a distance D from a first intersection to a second intersection ($X_N$, $Y_N$), error zone and update zones described above. Next, the arithmetic unit 12 retrieves automatically shortest course of travel interconnecting these intersections from the roadmap data storage unit 18 as a present course of travel in a step 120.

Figure 6A:
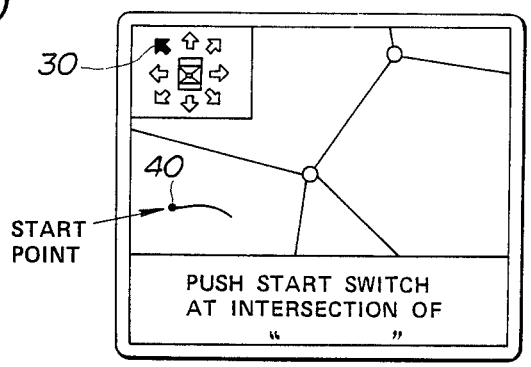
FIG. 6(a) is an explanatory view of a graphic image displayed on the display unit for guiding the vehicle toward a start intersection.

If, at this time, the present location of the vehicle expressed by (X, Y) is 300 meters or more spaced from the start intersection (negative answer in a step 140), the display unit 20 displays continuously an arrow-marked segment 30 indicating an orientation of the start intersection with respect to the forward movement direction of the vehicle and a piece of curved line 40 indicating a travel locus on which the vehicle has travelled together with the regional roadmap on its screen as shown in FIG. 6(a) in a step 130.

Figure 6B:
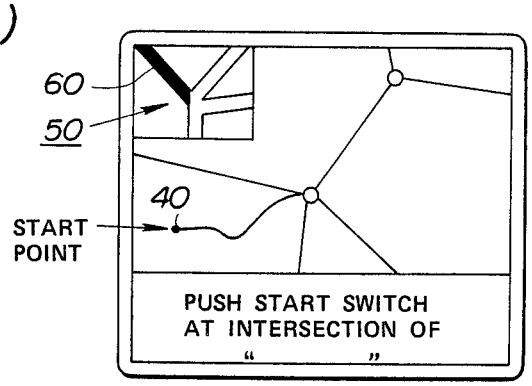
FIG. 6(b) is an explanatory view of a graphic image displayed on the display unit and which clearly indicates a start road when the vehicle is in the vicinity of the start intersection.

On the other hand, if the vehicle approaches the start intersection by 300 meters or shorter distance in the step 140, the display unit 20 displays a graphical representation 50 of the starting intersection with the forward movement direction of the vehicle matched with the longitudinal direction of the screen of the display unit 20 in place of the arrow-marked segment 30, as shown in FIG. 6(b), and displays a branched road 60 of the start intersection corresponding to the start road in which the vehicle is to be directed so as to travel along the preset course of travel from the start intersection in a bold line segment on the left uppermost corner of the screen in a step 150.

Figure 7:
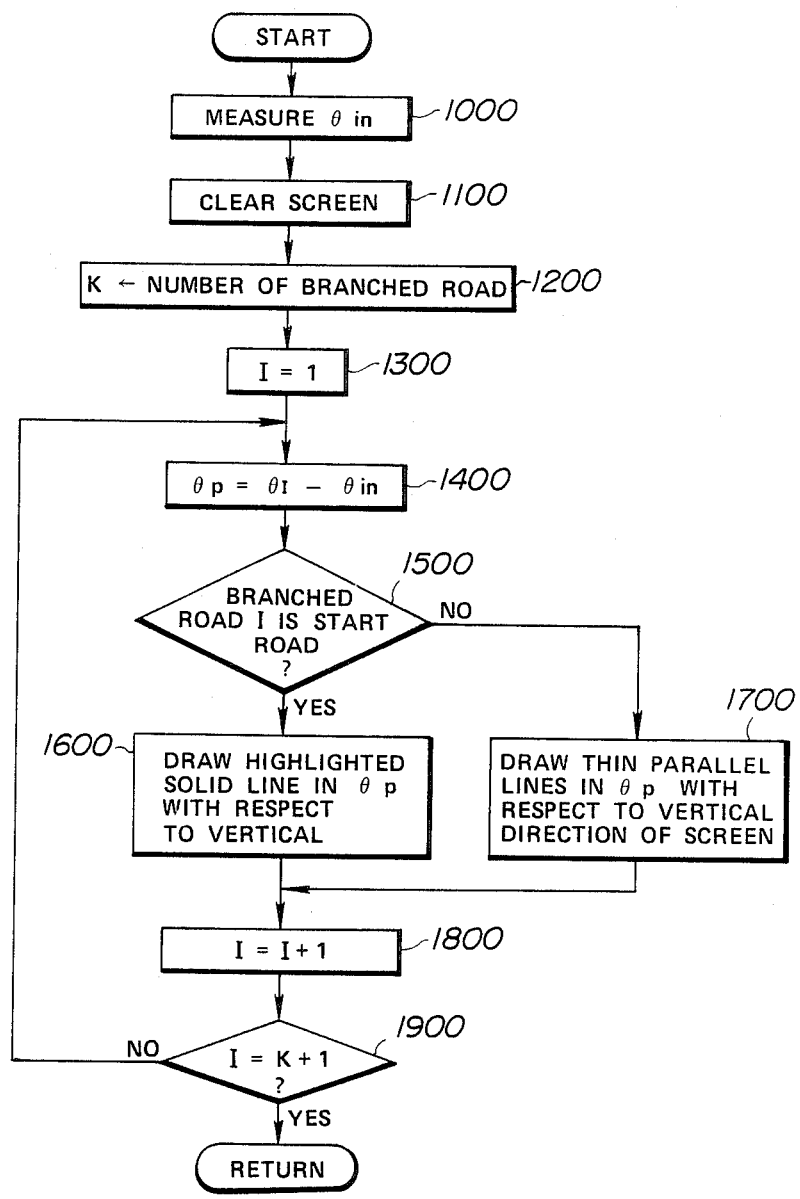
FIG. 7 is a processing flowchart indicating selection and display operations of the start road in the start intersection.

The contents of the step 130, i.e., the display process in the start intersection will be described in details with reference to a flowchart of FIG. 7. In a step 100, the entrance direction $\theta$in of the vehicle for the start intersection is measured. In a step 1100, the screen of the display unit 20 is once cleared.

Next, the arithmetic unit 12 retrieves the number of branched roads K radiated from the start intersection from the intersection information stored in the roadmap data storage unit 18 shown in FIGS. 2 and 3 and determines which of the branched road numbers I=1 through K corresponds to the start road in the following manner.

That is to say, the branched road number I is first set to 1 (I=1) in a step 1300.

Then, in a step 1400, a difference $\theta$p is calculated between the direction of the branched road $\theta_I$ and the entrance direction $\theta$in ($\theta p = \theta_I - \theta in$). If the first branched road (I=1) corresponds to the start road (Yes) in a step 1500, a straight road representation which is highlighted in the direction of $\theta$p with respect to the longitudinal direction of the display screen in a step 1600 since the first branched road 1 is determined as the start road.

On the other hand, if the first branched road (I=1) is determined not as the start road, a straight road representation is not highlighted but only in parallel thin lines in the direction of $\theta$p with respect to the longitudinal direction of the display screen in a step 1700.

Next, in a step 1800, the value I is incremented by one (I=I+1). If the value I is not equal to K+1 in a step 1900, the routine returns to the step 1400. This loop is repeated until the value I becomes equal to K (I=K) and then the routine goes to the subsequent step 160.

Figure 8A:
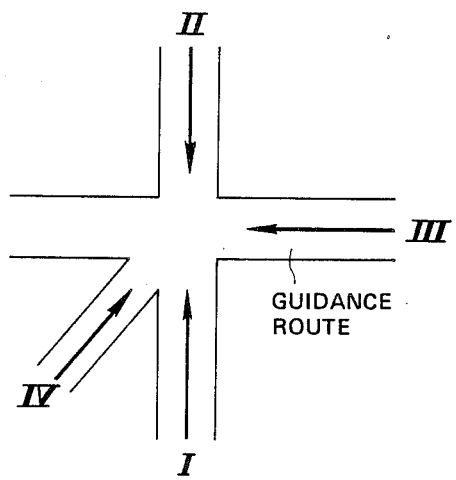
FIG. 8(a) is an explanatory view for explaining each route through which the vehicle is to be entered at the start intersection.
Figure 8B:
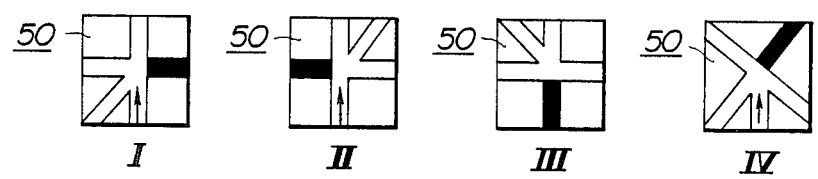
FIG. 8(b) is an explanatory view for explaining a display image on the display unit corresponding to each route through which the vehicle is to reach the start intersection shown in FIG. 8(a).

FIG. 8(a) shows each entrance direction of the vehicle toward the start intersection (in FIG. 8(a), the individual entrance directions are represented by arrow-marked solid lines with respective Roman numerals I, II, III, and IV) and FIG. 8(b) shows displayed images 50 superposed on the roadmap image at the left upper portion of the display screen and which individually correspond to the Roman numerals in FIG. 8(a).

As appreciated from FIG. 8(b), the entrance direction of the vehicle toward the start intersection is always displayed so that the arrow-marked line therefor directs vertically on the display screen and the start road branched from the start intersection is highlighted. Consequently, the driver can immediately grasp the start road to be entered at the start intersection even if the vehicle has reached the start intersection via any arbitrary route from the starting point.

As described above, the navigation system and method according to the present invention can clearly and distinguishably display the direction and location of the start road, from the start intersection on the display screen even if the vehicle has reached the start intersection via any arbitrary route from the starting point.

It will clearly be appreciated by those skilled in the art that the foregoing description is made in terms of the preferred embodiment and various modifications may be made without departing the scope of the present invention which is to be defined by the appended claims.

What is claimed is:

1. A system for navigating a vehicle, comprising:
   (a) first means for monitoring a distance travelled by the vehicle and vehicle direction and deriving data on the instantaneous position and direction of the vehicle;
   (b) second means for storing roadmap data including configurations of a plurality of known branching points;
   (c) third means for designating a route of travel from a first known branching point through which the vehicle is first to pass to a final destination;
   (d) fourth means for determining a first road connected to the first known branching point and through which the vehicle is to arrive at the first known branching point on the basis of the present direction of the vehicle with respect to the first known branching point, derived by said first means, and based on direction data stored in said second means for each road branched from the first known branching point; and
   (e) fifth means for displaying on a display screen thereof a relative positional relationship between the first road and a second road branched from the first known branching point and through which the vehicle is to travel along the designated route of travel from the first known branching point.

2. The system according to claim 1, which further comprises sixth means for determining whether the vehicle approaches a predetermined distance to the first known branching point on the basis of the instantaneous position of the vehicle derived by said first means and data on the position of the first known branching point stored in said second means and wherein said fourth means determines the first road when said sixth means determines that the vehicle has approached the predetermined distance to the first known branching point.

3. The system according to claim 2, wherein said fifth means displays a roadmap representation including the designated route of travel allowed by said third means and the instantaneous direction of the vehicle with respect to the first known branching point on the display screen until said sixth means determines that the vehicle has approached the predetermined distance to the first known branching point.

4. The system according to claim 3, wherein said fifth means clears the displayed contents on the display screen once the vehicle has approached the predetermined distance to the first known branching point.

5. The system according to claim 1, wherein said fifth means is operable for displaying the positional relationship between the first and second roads branched from the first known branching point using a graphical representation of the first known branching point, wherein an upper side of the display screen corresponding to a forward movement direction of the vehicle.

6. The system according to claim 5, wherein the first road is indicated by a solid line with an arrow, the arrow-marked direction corresponding to the direction in which the vehicle is to reach the first known branching point and the second road is indicated by a highlighted solid line so as to distinguish the second road from other roads branched from the first known branching point.

7. The system according to claim 6, wherein the arrow-marked solid line indicated in the first road is directed so as to coincide with the longitudinal upward direction of the display screen and the highlighted solid line representing the second road is displayed in a direction corresponding to the angle of the second road with respect to that of the first road.

8. The system according to claim 5, wherein said fifth means displays the graphical representation of the first known branching point together with a roadmap representation indicating at least a starting point of the vehicle, the first known branching point, a final known branching point, the destination, and designated route of travel.

9. The system according to claim 8, wherein said fifth means is further operable for displaying the graphical representation of the first known branching point at one corner of the display screen, thereby superposing the graphical representation with the display of the starting point, the first known branching point, final known branching point, destination, and designated route of travel.

10. The system according to claim 1, which further comprises:
(a) sixth means responsive to a command to start a navigation process for the vehicle along the designated route of travel by which the vehicle is guided from the first known branching point to the destination using the screen of said fifth means; and
(b) seventh means which provides the command to start the navigation process to said sixth means.

11. The system according to claim 10, wherein said fifth means displays a message to request a viewer of the display screen of said fifth means to operate said seventh means at the first known branching point before the vehicle reaches the first known branching point.

12. A method for navigating a vehicle, comprising the steps of:
(a) monitoring a distance travelled by the vehicle and vehicle direction and deriving the instantaneous position of the vehicle;
(b) providing storage means for storing roadmap data including configurations of a plurality of known branching points;
(c) designating a route of travel from a first known branching point through which the vehicle is first to pass to a final destination;
(d) determining a first road connected to the first known branching point and through which the vehicle is to arrive at the first known branching point on the basis of the present direction of the vehicle with respect to the first known branching point, derived in said step (a), and on the basis of direction data stored in said step (b) for each road branched from the first known branching point; and
(e) providing display means for displaying on a display screen thereof a relative positional relationship between the first road and a second road branched from the first known branching point and present in the designated route of travel.

13. The method according to claim 12, wherein said step (f) is carried out when the vehicle has approached a predetermined distance to the first known branching point.

14. The method according to claim 13, wherein the display means displays at least the present direction of the vehicle derived in said step (a) with respect to the position of the first known branching point on the screen thereof before the vehicle approaches the predetermined distance to the first known branching point.

15. The method according to claim 14, wherein the display means also displays the roadmap representation including the designated route of travel before the vehicle approaches the predetermined distance to the first known branching point.

16. The method according to claim 12, wherein in said step (f) the display means is operable for performing the step of displaying the configuration of the first known branching point in a graphic form wherein a longitudinal direction of the display screen corresponds to the direction of the first road.

17. The method according to claim 16, wherein in said step (f) the display means displays the second road with a highlighted solid line directed so as to correspond to an angle of the second road with respect to the first road.

18. The method according to claim 16, wherein, in said step (f), the display means displays the roads branched from the first known branching point, with the roads other than the second road indicated by two parallel solid lines and the second road indicated by a highlighted bold solid line.

* * * * *